May 3, 1966 G. R. SCHULZ 3,249,275

CONTINUOUS LOOP TAPE STORAGE APPARATUS

Filed June 14, 1962 5 Sheets-Sheet 1

May 3, 1966 G. R. SCHULZ 3,249,275

CONTINUOUS LOOP TAPE STORAGE APPARATUS

Filed June 14, 1962 5 Sheets-Sheet 2

INVENTOR.
GORDON RICHARD SCHULZ
BY
Christie, Parker & Hale
ATTORNEYS.

May 3, 1966 G. R. SCHULZ 3,249,275

CONTINUOUS LOOP TAPE STORAGE APPARATUS

Filed June 14, 1962 5 Sheets-Sheet 3

INVENTOR.
GORDON RICHARD SCHULZ
BY
Christie, Parker & Hale
ATTORNEYS.

May 3, 1966 G. R. SCHULZ 3,249,275

CONTINUOUS LOOP TAPE STORAGE APPARATUS

Filed June 14, 1962 5 Sheets-Sheet 5

INVENTOR.
GORDON RICHARD SCHULZ
BY
Christie, Parker & Hale
ATTORNEYS.

United States Patent Office 3,249,275
Patented May 3, 1966

3,249,275
CONTINUOUS LOOP TAPE STORAGE APPARATUS

Gordon Richard Schulz, Tujunga, Calif., assignor to Ralph M. Parsons Company, Pasadena, Calif., a corporation of California Filed June 14, 1962, Ser. No. 202,498
10 Claims. (Cl. 226—118)

This invention relates to magnetic tape transports, and more particularly, is concerned with a continuous loop storage arrangement for magnetic tape transports.

Magnetic tape transports generally fall into two classes, reel storage transports and continuous loop storage transports. In the latter class of transports, the magnetic tape is stored in a bin or a similar storage chamber in which the tape is permitted to pile up in loops as the tape is fed into the bin. Such an arrangement is particularly useful where a continuous loop of tape is being used since the tape can be withdrawn from the bin at the same time tape is being fed into the bin. Generally the bin is arranged with parallel walls spaced a distance slightly greater than the width of the tape so that the loops of tape pile up one on top of the other in the bin. Normally the weight of the tape is so small in proportion to the springiness of the tape loops that the bottom loops are not compressed materially by the weight of the loops piled on top.

However, under abnormal conditions, as where the tape transport is subject to high acceleration forces, the tape loops may become flattened to the point where the tape is creased; the tape loops then do not completely straighten out when withdrawn from the bin. Any crease in the tape affects its reliability in reproducing information, causing what is known in the art as "dropouts."

Thus, the continuous loop arrangement, although it has the advantage of avoiding reel drive mechanisms and tape reversing drive mechanisms, has the disadvantage that the tape is more apt to become damaged, particularly under high acceleration conditions as might be encountered in instruments carried by a missile or the like.

Also, the tape is more apt to become damaged in bin type storage of tape loops due to jamming of the tape around the exit region of the bin. Particularly where a high density of tape is to be stored in a small bin, the springiness of the tape in the loops results in a tendency to bunch at the exit, again causing the tape to be creased.

The present invention provides an improved continuous loop storage arrangement for a magnetic tape transport in which the magnetic tape loops are securely held so that the tape cannot shift when subjected to high acceleration forces and the tape loops do not crowd the tape into the exit region. This is accomplished, in brief by a loop storage arrangement in which the tape extends back and forth in serpentine fashion between two surfaces which frictionally engage the edges of the tape, securely holding the tape loops in place between the two surfaces. Preferably, one surface is in the form of a cylindrical drum and the other surface is in the form of a concentric flexible sleeve. A portion of the continuous length of tape is withdrawn from between the two surfaces and passes through an operational zone before returning back to the space between these two surfaces. The cylindrical drum and flexible sleeve are caused to rotate in relation to the operational zone so that successive loops of tape secured between the clamping surfaces can be drawn through the operational zone as the drum rotates. New loops are formed as the tape is returned to the space between the clamping surfaces after passing through the operational zone. Preferably, a belt is provided which passes transversely through the space between the drum and sleeve, the tape being brought into frictional engagement with the belt and the belt acting to drag the tape from the operational zone into the space between the drum and sleeve, where the tape is reformed into new loops as the drum and sleeve rotate.

For a more complete understanding of the invention, reference should be had to the accompanying drawings, wherein.

Figure 1:
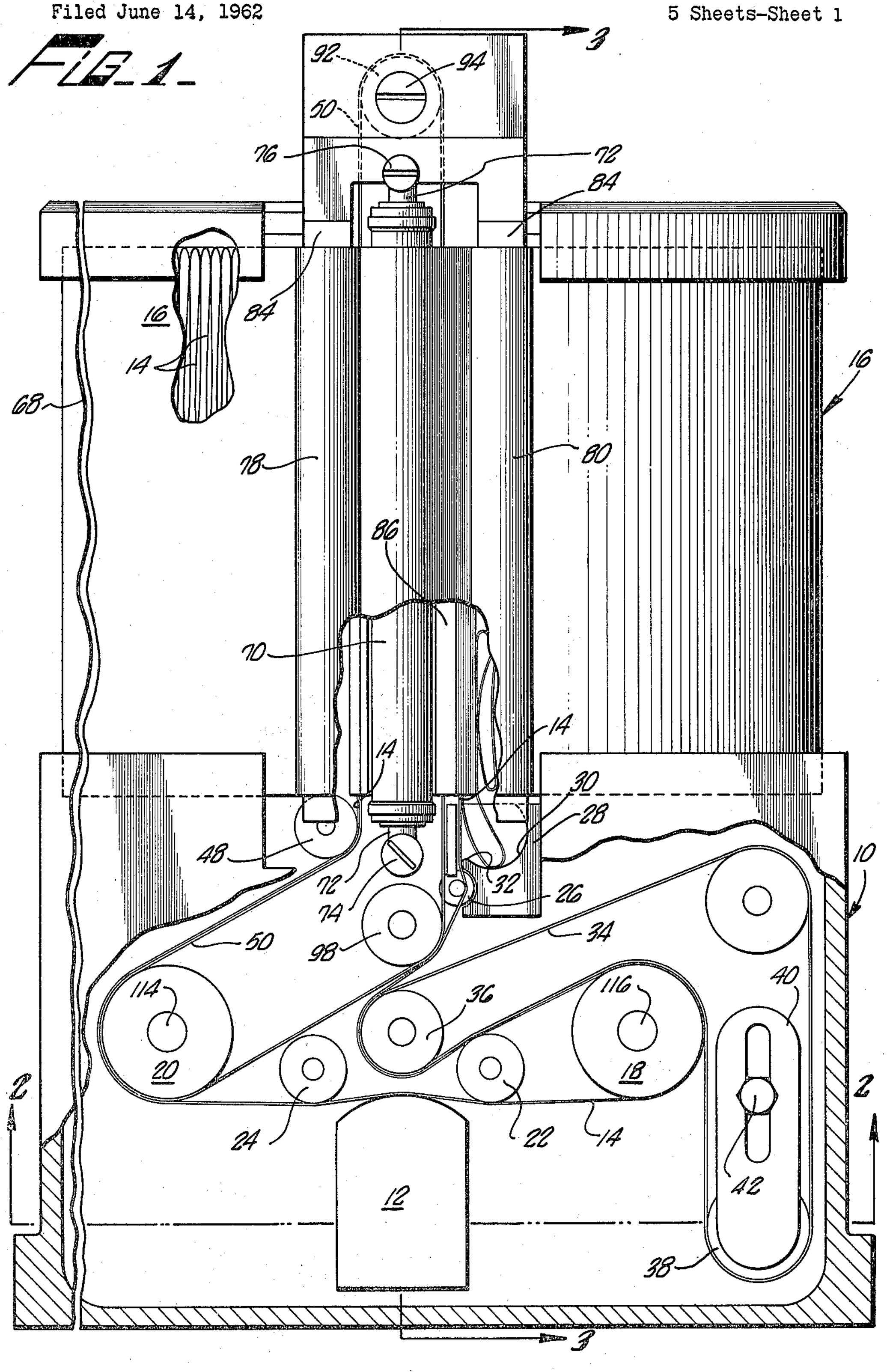
FIGURE 1 is a side elevational view, partly cut away, of the tape transport of the present invention.

Referring to the drawings in detail, the numeral 10 indicates generally the main frame of the tape transport which serves as a housing for the drive mechanism. As best seen in FIGURE 1, the front of the housing provides the operational zone in which is located a magnetic head 12 for recording and playing back information on an endless length of magnetic tape, a portion of which is indicated at 14. The magnetic tape is driven through the operational zone past the head 12, being withdrawn from and returned to a tape storage arrangement located above the housing 10 and indicated generally at 16.

The operational zone includes a pair of drive capstans 18 and 20, which are rotated at constant speed by a drive arrangement to be hereinafter described. A pair of guide rollers 22 and 24 are positioned on either side of the head 12 for guiding the tape across the surface of the head 12.

The tape 14 enters the operational zone through a storage exit slit formed by a stationary edge-guiding post 26 and a tape loop separating block 28. The block 28 is formed with a semi-circular surface 30 terminating in a slightly rounded edge 32 at the exit slit. The edge 32 operates, as will hereinafter become more apparent, to separate the tape passing out through the exit slit from any adjacent loops within the storage region. After passing over the guide post 26, the tape engages an endless belt 34 at the point where it passes over an idler pulley 36. The tape 14, moving in contact with the endless belt 34 passes around the pulley 36 and over the top edge of the guide roller 22. The tape then passes around the capstan 18, the tape being pressed into engagement with the capstan 18 by the pressure of the drive belt 34. The endless belt 34 is held in tension by an adjustable idler pulley 38 journaled on a bracket 40 which is adjustably secured to the frame 10 as by means of a screw 42 passing through a slot 44. The belt extends around another idler 46 to complete its endless drive path.

After passing over the drive capstan 18, the tape 14 is directed under the guide roller 22 up over the top of the head 12 back under the idler 24 and around the capstan 20. The tape then returns to the storage region 16 by passing through an entrance slit formed by a guide roller 48. The tape in passing over the capstan 20 is brought in contact with the surface of a second endless drive belt 50 which helps drive tape back into the storage region in a manner to be hereinafter described in detail.

Figure 3:
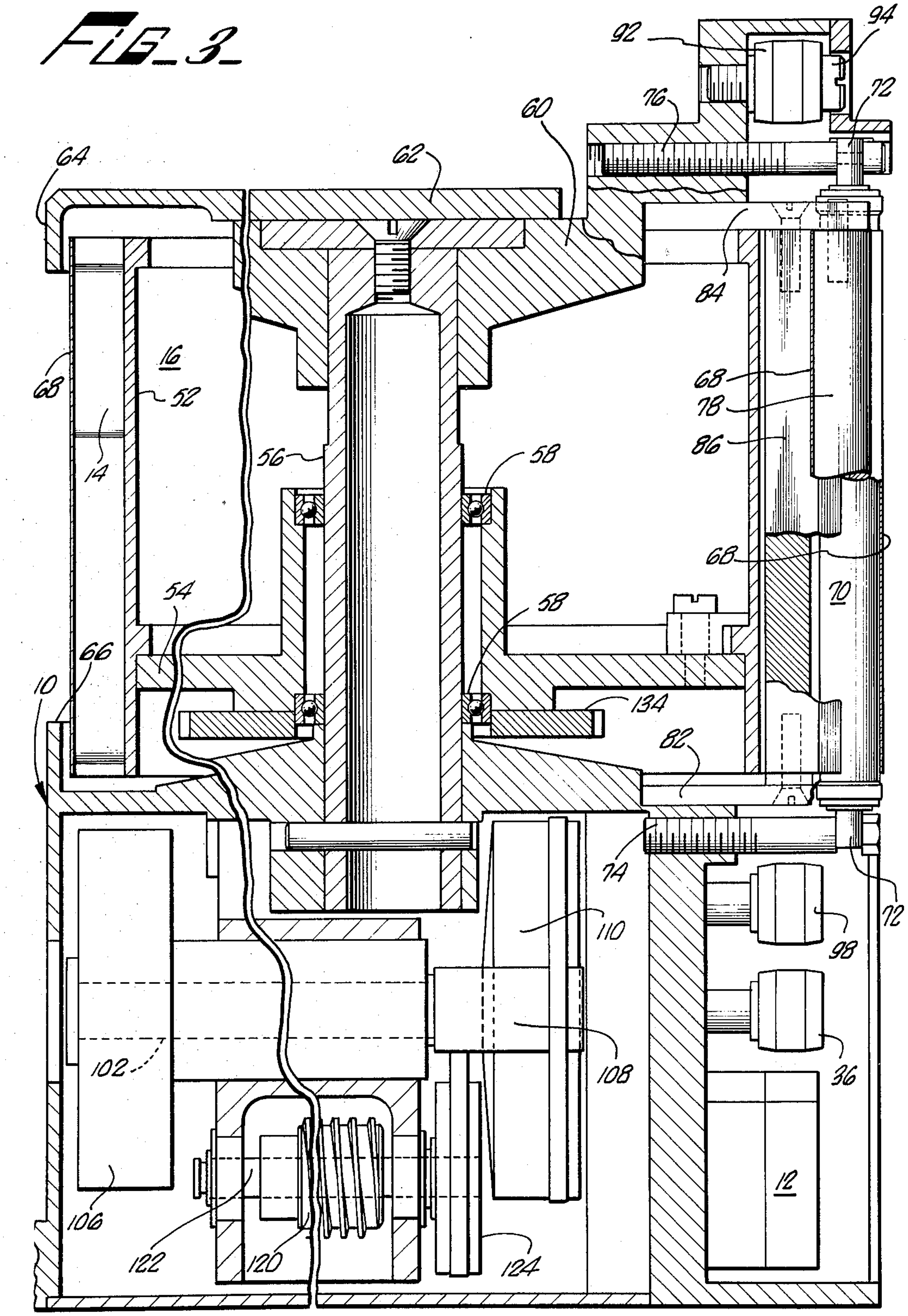
FIGURE 3 is a sectional view taken substantially on the line 3—3 of FIGURE 1.

The storage region 16 in the preferred embodiment of the invention includes a cylindrical drum 52 (see FIG. 3) which is supported on a hub 54, the hub 54 in turn being rotatably journaled on a post 56 projecting above and secured to the housing 10. The hub 54 is rotatably journaled on the post 56 by means of suitable bearings indicated at 58. A frame bracket 60 is secured to the upper end of the post 56, the frame bracket 60 in turn supporting a cover plate 62 which extends over the top of the drum 52 and is provided with a downwardly turned lip 64 which overlaps the drum 52 in spaced concentric relationship. A corresponding flange 66 on the top of the housing 10 extends upwardly in overlapping spaced concentric relationship to the drum 52 adjacent the lower edge of the drum 52.

The drum 52 is rotated by the same drive mechanism, to be hereinafter described, which drives the capstans 18 and 20. As the drum 52 rotates, the tape 14 is caused to loop back and forth on the surface of the drum by the action of the drive belt 50. The tape is looped back and forth in a direction parallel to the axis of rotation of the drum and extends around the drum in serpentine fashion in the manner indicated in FIGURE 1. The tape loops are held edgewise against the surface of the drum by means of a flexible sleeve 68 which surrounds the drum 52 within the lips 64 and 66. The flexible sleeve 68 engages the edges of the tape loops so that the tape loops are clamped edgewise against the surface of the drum 52 by the sleeve 68. The sleeve 68 is held in tension by an adjustable elongated idler 70 located between the exit and entrance slits where the tape passes between the storage region 16 and the operational zone of the housing 10. The idler 70 is journaled on a stationary shaft 72 which is anchored at each end by screws 74 and 76. The screw 74 extends into a threaded portion of the housing 10 and the screw 76 extends into a threaded opening in the upper frame bracket 60. Thus, screws 74 and 76 may be used to adjust the radial distance between the idler 70 and the surface of the drum 52.

The flexible sleeve 68 passes under guide rollers 78 and 80 located on either side of the adjustable idler 70. The guide rollers 78 and 80 are rotatably supported at each end between suitable support brackets as indicated at 82 and 84 in FIGURE 3.

It will be noted that in the region between the two guide rollers 78 and 80, the flexible sleeve 68 is directed away from the surface of the drum 52 so that no clamping action of the tape loops can take place in this region. It is within this region that the tape is withdrawn and reinserted into the annular storage space provided between the drum 52 and sleeve 68.

A stationary guide member 86 is positioned in the space between the idler 70 and the outer surface of the drum 52. The guide member 86 provides a flat surface 88 adjacent the exit position of the stored tape. The drum 52 rotates in a direction to continuously bring the stored tape loops into contact with the surface 88 at which point the tape 14 is drawn out through the exit slit over the guide post 26 in the manner described above.

It will be noted that the surface 88 is positioned within the region between the guide rollers 78 and 80 so that at the point of exiting, the tape is free of the clamping action of the sleeve 68 which normally holds the tape in contact with the surface of the drum 52. Thus, the tape loops become free and substantially no load is imposed on the tape as it is drawn out into the operational zone.

Figure 4:
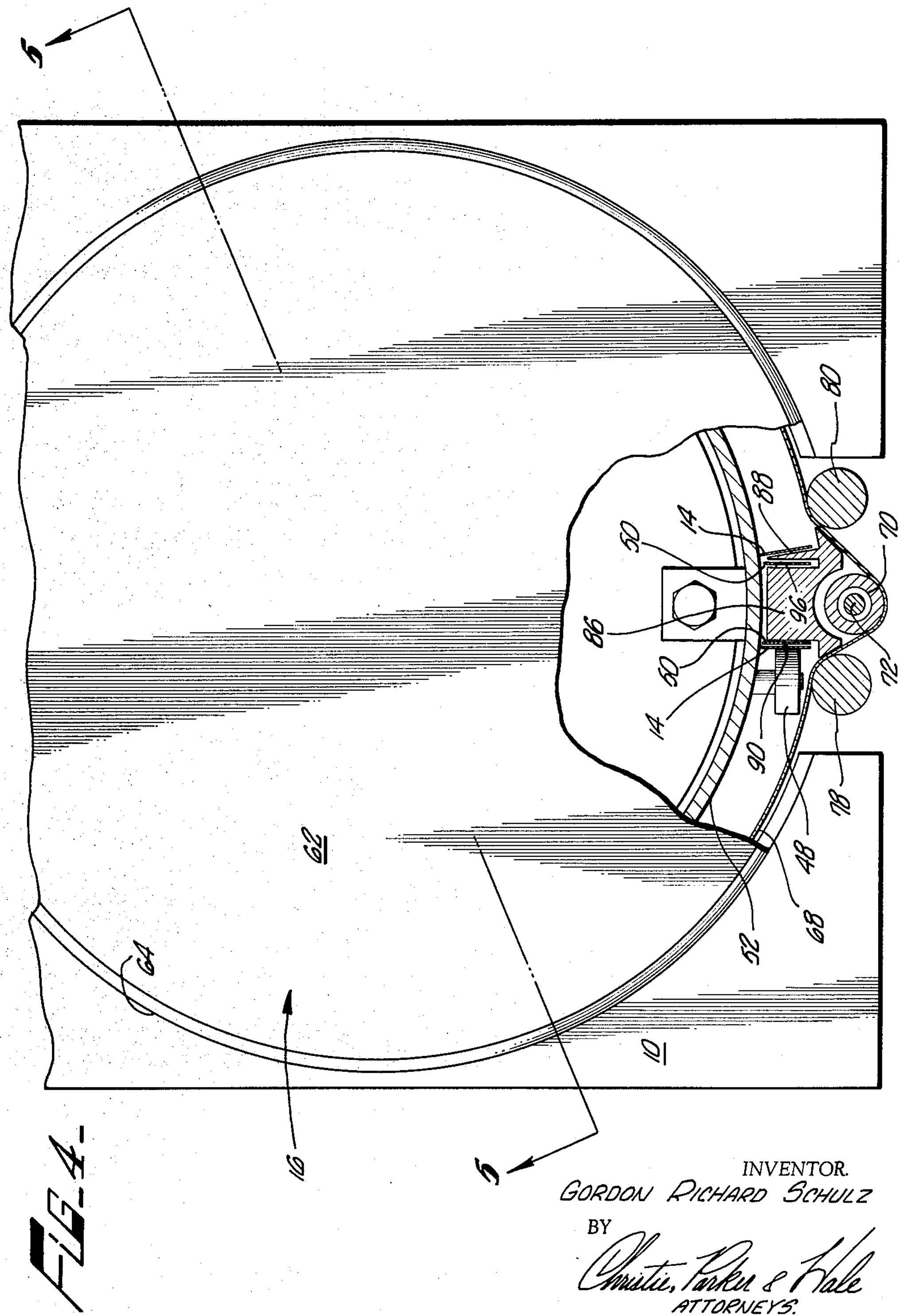
FIGURE 4 is a top view of the tape transport of FIGURE 1.

In order to form the tape storage loops on the surface of the drum 52, the belt 50, after passing over the guide roller 48, extends upwardly through the space between the drum 52 and sleeve 68 along a surface 90 (see FIG. 4) of the stationary guide member 86. The belt 50 then passes over a guide pulley 92 which is journaled on a stud shaft 94 secured to the upper frame bracket 60.

The belt 50 returns to the operational zone through a slot 96 (see FIG. 4) in the stationary guide member 86, the belt passing over a guide pulley 98 located below the guide roller 70 in the operational zone of the housing 10.

In operation, the belt 50 carries the magnetic tape upwardly into the space between the drum 52 and the sleeve 68. The belt 50 passes into the region between the guide rollers 78 and 80 and therefore is not immediately in contact with the sleeve 68. As the belt 50 drags additional tape into this space, the tape is automatically formed into a loop, which loop is pushed away from the belt 50 and into contact with the sleeve 68. Thus as successive loops are formed by the action of the belt 50, they become clamped in edgewise relationship between the flexible sleeve 68 and the surface of the drum 52. Rotation of the drum and sleeve carries the loops away from the belt 50 so that new tape loops can be continuously formed as the tape is continuously inserted into the storage region.

Figure 2:
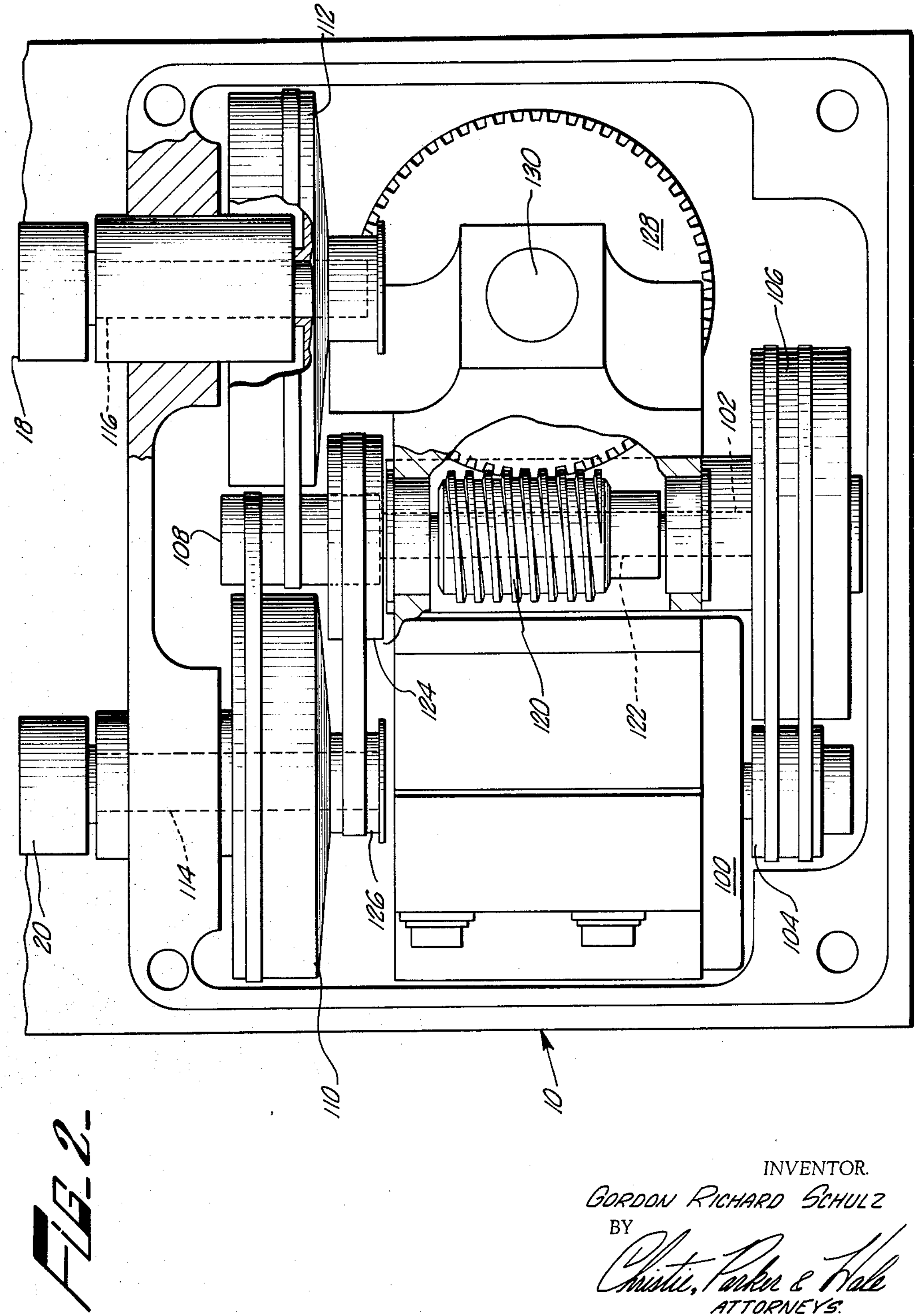
FIGURE 2 is a sectional view taken substantially on the line 2—2 of FIGURE 1.

Rotation of the capstans 18 and 20 and the drum 52 is derived from an electric motor 100 positioned in the inside of the housing 10, as best seen in FIGURE 2. By means of a belt drive, the motor 100 rotates an intermediate drive shaft 102, the belt engaging a pulley 104 on the shaft of the motor and a much larger pulley 106 on the intermediate drive shaft 102. The shaft 102 is journaled in bearings supported by portions of the housing 10.

The opposite end of the intermediate drive shaft 102 is provided with a pulley 108. A belt drive is provided between the pulley 108 and pulleys 110 and 112 positioned on the ends of the capstan drive shafts 114 and 116, respectively. The capstan shafts are journaled in bearings supported by the housing 10, the capstans 18 and 20 being located on the other end of the capstan shafts 114 and 116, as best shown in FIGURE 2.

Figure 5:
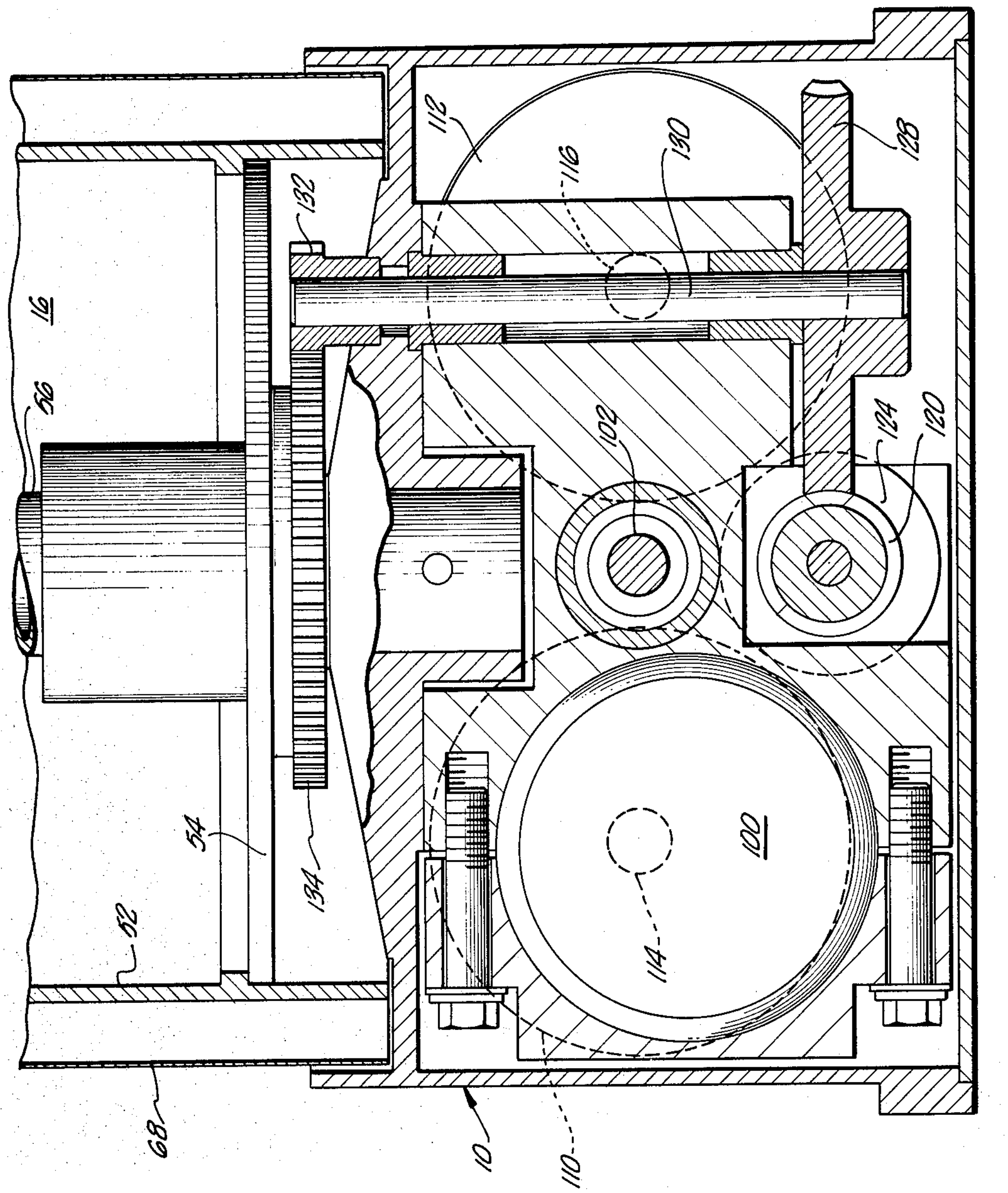
FIGURE 5 is a partial sectional view taken substantially on the line 5—5 of FIGURE 4.

Rotation of the drum is accomplished by means of a worm gear 120 mounted on a shaft 122 which is journaled in bearings supported by the housing 10. The shaft 122 is provided with a pulley 124 which is belt-driven by a pulley 126 on the capstan shaft 114. The worm gear 120 engages a worm wheel 128 on the lower end of a vertical shaft 130 which is also journaled in suitable bearings supported by the housing 10 (see FIG. 5). The upper end of the shaft 130 projects out of the top of the housing 10 and is provided with a spur gear 132 which engages a ring gear 134 secured to the lower end of the hub 54. Thus positive drive motion is applied to the drum 52 from the motor 100.

The drive ratios are arranged such that the capstans 18 and 20 drive the full length of the endless stored tape 14 through the operational zone in the same time that the drum 52 completes one revolution.

From the above description, it will be recognized that the rotating drum and flexible sleeve provide a unique storage arrangement for the magnetic tape. The magnetic tape, by the action of the belt 50, is caused to loop back and forth on the surface of the drum 52 in serpentine fashion, the tape loops being held in edgewise position on the surface of the drum 52 by the clamping action of the flexible sleeve 68 under tension. Thus once the loops are formed in the storage region, they are securely held against any shift due to external acceleration forces.

What is claimed is:

1. Tape transport apparatus having an operational zone through which the tape is driven, comprising a cylindrical drum, an endless length of tape looping back and forth edgewise on the surface of the drum, the tape extending in serpentine fashion around the full periphery of the drum, a flexible sleeve extending around the drum and in contact with the exposed edge of the tape for frictionally holding the tape loops in fixed position on the surface of the drum, guide means for maintaining a portion of the sleeve out of contact with the tape edge and forming an enlarged space where a portion of the tape can be freely inserted and withdrawn from between the drum and the sleeve, a feed belt, means for guiding the feed belt across the surface of the drum in a direction parallel to the axis of revolution of the drum, the belt passing through said enlarged spaced between the drum and the sleeve with the belt being positioned edgewise to the surface of the drum, drive means for driving the belt, means for guiding a portion of the tape from the drum through the operational zone and into contact with the belt, the belt frictionally engaging the tape and dragging the tape from the operational zone back into said enlarged space between the drum and sleeve, and means for rotating the drum in relation to the operational zone, the drum being rotated one revolution during the time the full length of tape passes through the operational zone.

2. Tape transport apparatus having an operational zone through which the tape is driven, comprising a drum, an endless length of tape looping back and forth edgewise on the surface of the drum, the tape extending in serpentine fashion around the full periphery of the drum, a flexible sleeve extending around the drum and in contact with the exposed edge of the tape for frictionally holding the tape loops in fixed position on the surface of the drum, guide means for maintaining a portion of the sleeve out of contact with the tape edge and forming an enlarged space where a portion of the tape can be freely inserted and withdrawn from between the drum and the sleeve, a feed belt, means for guiding the feed belt across the surface of the drum in a direction parallel to the axis of revolution of the drum, the belt passing through said enlarged space between the drum and the sleeve with the belt being positioned edgewise to the surface of the drum, drive means for driving the belt, means for guiding a portion of the tape from the drum through the operational zone and into contact with the belt, the belt frictionally engaging the tape and dragging the tape from the operational zone back into said enlarged space between the drum and sleeve, and means for rotating the drum in relation to the operational zone.

3. Tape transport apparatus having an operational zone through which the tape is driven, comprising a means defining a continuous surface that closes on itself, the surface being substantially flat in the transverse dimension, an endless length of tape having one edge in contact with said surface, the tape being arranged in loops extending in serpentine fashion around the periphery of said surface defining means, a flexible sleeve in contact with the exposed edge of the tape for frictionally holding the tape loops in fixed position on said surface, guide means for maintaining a portion of the sleeve out of contact with the tape edge and forming an enlarged space where a portion of the tape can be freely inserted and withdrawn from between said surface and the sleeve, a feed belt, means for guiding the feed belt through the enlarged space in a direction parallel to said transverse dimension of the surface defining means, drive means for driving the belt, means for guiding a portion of the tape through the operational zone and into contact with the belt, the belt frictionally engaging the tape and dragging the tape from the operational zone back into said enlarged space between the drum and sleeve and means for moving said surface relative to the operational zone and the position of the belt when it passes through said enlarged space.

4. Magnetic tape apparatus comprising a drum, a sleeve surrounding the drum, an endless length of magnetic tape, the tape being looped in serpentine fashion in the space between the sleeve and the drum with opposite edges of the tape engaged respectively with the outer surface of the drum and the inner surface of the sleeve, a portion of the tape extending in a closed loop beyond one edge of the drum, a transducer head, said portion of the tape passing over the head, means for driving the tape across the head, said drive means withdrawing tape from between the drum and sleeve, means for inserting the tape back between the drum and sleeve as it leaves the head, said means causing the tape to loop back and forth lengthwise of the drum, and means for rotating the drum substantially one revolution during the interval that the full length of tape passes over the head.

5. Magnetic tape apparatus comprising a drum, a sleeve surrounding the drum, an endless length of magnetic tape, the tape being looped in serpentine fashion in the space between the sleeve and the drum with opposite edges of the tape engaged respectively with the outer surface of the drum and the inner surface of the sleeve, a portion of the tape extending in a closed loop beyond one edge of the drum, a transducer head, said portion of the tape passing over the head, means for driving the tape across the head, said drive means withdrawing tape from between the drum and sleeve, and means for inserting the tape back between the drum and sleeve as it leaves the head, said means causing the tape to loop back and forth lengthwise of the drum.

6. In a magnetic tape device in which magnetic tape is driven through an operational zone, tape storage apparatus comprising a cylindrical drum, the tape being wound on the surface of the drum in serpentine fashion with one edge of the tape being in contact with the cylindrical surface of the drum and the surface of the tape being substantially perpendicular to the cylindrical surface of the drum, a flexible belt passing around the drum and in contact with the outer edge of the tape whereby the tape is held edgewise between the cylindrical surface of the drum and the surrounding belt, a portion of the tape passing from the storage apparatus through the operational zone and back to the storage apparatus.

7. Tape transport apparatus comprising tape storage means defining an annular chamber having concentrically spaced walls, an endless length of tape stored in the chamber, the tape being looped in serpentine fashion with opposite edges of the tape being clamped between the two concentric walls, whereby the loops of tape are frictionally secured by the inner walls of the chamber, means defining an operational zone including a transducer and tape drive means for moving the tape past the transducer, means for guiding a loop of tape from the tape storage means through the operational zone and back to the tape storage means, and means for moving the concentric walls of the tape storage means in synchronism relative to the operational zone such that the clamping walls transport the tape toward and away from the operational zone.

8. Apparatus for storing and transporting tape through an operational zone comprising means providing a first continuous surface of uniform width that closes on itself in one direction, an endless length of tape looped in serpentine fashion with one edge engaging said surface, the length of the loops being substantially the same as the width of said surface, means providing a second continuous surface of uniform width that closes on itself and engages the other edge of the tape, whereby the tape is held edgewise between the first and second surfaces, means for directing the tape through the operational zone including means for withdrawing tape from between the two surfaces and reinserting the tape in loops between the surfaces, and means for moving the tape loop engaging surfaces in synchronism with each other relative to the operational zone.

9. Apparatus for storing and transporting tape through an operational zone comprising means providing a continuous surface of uniform width that closes on itself in one direction, an endless length of tape looped in serpentine fashion with one edge engaging said surface, means for clamping the tape edge in frictional engagement with said continuous surface to lock the tape loops in position against said surface, means for directing the tape through the operational zone including means for withdrawing tape from between the surface and the clamping means and reinserting the tape in loops between the surface and clamping means, and means for moving the tape loop engaging surface and the tape clamping means in synchronism with each other relative to the operational zone to transport the tape loops toward and away from the operational zone.

10. In a magnetic tape device in which magnetic tape is driven through an operational zone, tape storage apparatus comprising means defining a first surface, means defining a second surface, the surfaces being spaced apart by an amount equal to the width of the tape so that the tape can be held edgewise between the two surfaces, means for moving the two surfaces in synchronism relative to the operational zone, means for inserting the tape from the operational zone at a first position edgewise between the two surfaces, said inserting means including means for looping the tape in serpentine fashion whereby the loops are clamped between and moved by the two moving surfaces, and means for withdrawing tape into the operational zone at a second position, the tape loops being moved by the two surfaces defining means from the first position to the second position.

References Cited by the Examiner

UNITED STATES PATENTS

| | | | |
|---|---|---|---|
| 1,296,476 | 3/1919 | Burnett | 226—118 |
| 3,033,433 | 5/1962 | Kattman et al. | 226—108 |

FOREIGN PATENTS

| | | |
|---|---|---|
| 567,151 | 5/1958 | Belgium. |
| 79,753 | 11/1955 | Denmark. |
| 455,734 | 12/1950 | Italy. |

ROBERT B. REEVES, *Primary Examiner.*

HARRISON R. MOSELEY, WILLIAM B. LA BORDE, *Examiners.*

C. J. BORUM, *Assistant Examiner.*